United States Patent
Puzik

[19]

[11] Patent Number: 5,593,366
[45] Date of Patent: Jan. 14, 1997

[54] BEADED GUIDE ROLLER

[75] Inventor: Alois Puzik, Gifhorn, Germany

[73] Assignee: Volkswagen AG, Wolfsburg, Germany

[21] Appl. No.: 432,782

[22] Filed: May 2, 1995

[30] Foreign Application Priority Data

May 4, 1994 [DE] Germany .......................... 44 15 634.0

[51] Int. Cl.⁶ .................................................. F16H 55/36
[52] U.S. Cl. ........................... 474/177; 474/189; 474/190
[58] Field of Search ........................... 474/166, 168–170, 474/177, 178, 189, 190

[56] References Cited

U.S. PATENT DOCUMENTS

| | | |
|---|---|---|
| 1,095,445 | 5/1914 | Alvey . |
| 1,568,401 | 1/1926 | Griffith . |
| 1,660,538 | 2/1928 | Whitney . |
| 3,430,506 | 3/1969 | Stone . |
| 3,713,348 | 1/1973 | Conrad et al. ........................ 474/189 X |
| 3,860,780 | 1/1975 | Conrad ................... 474/189 X |

FOREIGN PATENT DOCUMENTS

| | | |
|---|---|---|
| 3824645 | 1/1990 | Germany . |
| 4304829 | 1/1996 | Germany . |

*Primary Examiner*—Roger J. Schoeppel
*Attorney, Agent, or Firm*—Brumbaugh, Graves, Donohue & Raymond

[57] ABSTRACT

To reduce the generation of noise in a belt drive for auxiliary units in an internal combustion engine, a guide roller for the belt has an approximately cylindrical surface formed with a bead which extends along the surface in a direction oblique to the side surfaces of the guide roller. The resulting variation in the location of the bead with respect to a drive belt engaging the guide roller surface causes the unsupported vibratable length of the belt to vary according to the location of the contact point of the belt with the bead, which varies as the roller rotates. This produces a variation in the natural frequencies of tensile strands in the drive belt, which reduce the sympathetic vibrations of the belt and hence the propagation of noise through the guide roller.

8 Claims, 2 Drawing Sheets

BEADED GUIDE ROLLER

BACKGROUND OF THE INVENTION

This invention relates to guide rollers supported for rotation about a longitudinal axis and having a cylindrical, concave or convex peripheral surface.

Such guide rollers are used, for example, as pulleys in synchronous belt drives or belt tensioning devices by which a drive belt extending between an internal combustion engine and one or more auxiliary components is adjusted to provide the belt tension necessary for reliable operation. Such a belt tensioning device is disclosed, for example, in German Offenlegungsschrift No. 38 24 645 in which a guide roller supported on a spring-loaded lever arm has substantially cylindrical shape including a cylindrical surface and has raised rims at the sides of the cylindrical surface to assure better guidance of a drive belt on the roller.

In the operation of devices provided with drive belts, background noise is generated in the unsupported sections of a drive belt extending between drive wheels, pulleys and guide rollers as a result of sympathetic vibrations. These vibrations are transferred through the drive wheels to the engine structure and are transmitted through the air as sound. As used herein the term "guide roller" includes a pulley, drive wheel, tension roller or other rotatable member having a peripheral surface arranged to be engaged by a drive belt.

SUMMARY OF THE INVENTION

Accordingly, it is an object of the present invention to provide a guide roller which overcomes the disadvantages of the prior art.

Another object of the invention is to provide a guide roller for belt drives which is arranged to reduce the generation and propagation of noise through the structures engaged by the drive belt.

These and other objects of the invention are attained by providing a guide roller having a peripheral surface and at least one bead on the peripheral surface in which the lateral position of the bead on the surface varies with the angular location around the circumference of the roller.

The invention is based on recognition of the fact that sympathetic vibrations of unsupported belt sections between spaced guide rollers are a function of the natural frequency of tensile strands embedded in the drive belt. Each of the individual tensile strands in a drive belt has the same natural frequency and, since the same belt length subject to vibration between two conventional cylindrical guide rollers affects each of these strands, the same belt force and belt mass act on all individual strands.

By providing the roller surface with a bead running obliquely on the surface, a distribution of natural frequencies in the drive belt can be generated which is dependent upon the position of the tensile strands in the belt and the angle of rotation of the roller. As a result, a pronounced uniform natural frequency of the tensile strands, and hence of the drive belt, is no longer generated in the unsupported belt sections extending between two guide rollers. Instead, because of the variation in bead location across the width of the belt, a range of natural frequencies is generated which is determined by the degree of modulation of the guide roller surface by the bead. This degree of modulation is a function of the ratio of roller periphery to the length of the period of variation in position of the bead on that surface.

This range of natural frequencies produces the desired result that the belt sections which are in contact with a guide roller having such a bead build up little or no sympathetic vibration and hence produce little or no noise. In addition, the bead extending obliquely on the surface of the roller reduces the contact area between the roller and the belt as the belt approaches and leaves the roller. This reduces the introduction of belt vibrations into the roller and hence further reduces the transfer of vibrations to the engine structure.

The bead, which extends obliquely along the surface of the roller may have a rectangular cross-section but it preferably has a semicircular or elliptical cross section. Alternatively, the bead may have an upper surface of variable height in which the location of the highest point varies across the width of the roller surface with the angular position of the roller. This bead arrangement makes the area of the contact surface on the guide roller which is available to engage the drive belt as large as possible, while at the same time making certain that certain portions of the drive belt engage a larger roller diameter than other portions, depending upon the location of the high point of the bead, and thus some tensile strands in the drive belt are stretched more than others.

The bead may follow a path along the roller surface which is sinusoidal or approximately zigzag. Alternatively, a double-bead arrangement may be provided on the surface of the guide roller in which each of two beads extends half way around the roller and follows a sine-curve and a cosine-curve path, respectively, on the surface of the roller.

In another arrangement, the roller has at least two beads extending completely around the surface with one bead following an approximately sine-curve path and the other following a cosine-curve path on the surface.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
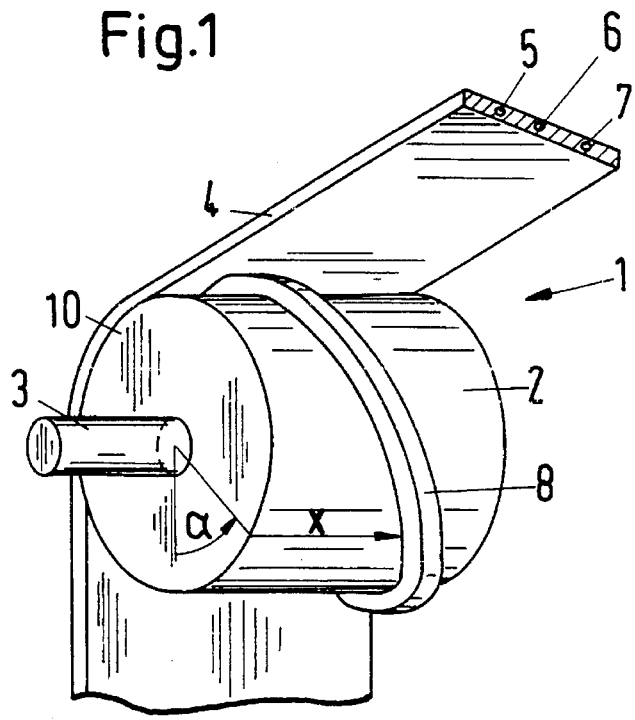
FIG. 1 is a perspective view showing a representative guide roller arranged according to the invention having a bead which follows a sine-curve path on the roller surface.

In the typical embodiment of the invention shown in FIG. 1, an approximately cylindrical guide roller 1 has a substantially cylindrical peripheral surface 2, and two side faces 10 extending perpendicular thereto. The roller 1 is supported for rotation by a support shaft 3. A bead 8 formed on the surface 2 has a lateral position x between the side surfaces 10 which, in this embodiment, varies in sinusoidal fashion as a function of the angular position $\alpha$ of the roller 1. A drive belt 4 which passes around the roller 1 consists of a rubbery material containing individual tensile strands 5–7 arranged in a conventional manner.

As the roller 1 rotates about its support shaft 3, different lateral regions of the drive belt 4 come into contact with the bead 8 depending upon the angular position α of the belt on the roller surface so that the unsupported vibratable length of the belt extending between the guide roller 1 and an adjacent guide roller is continuously varied. Because of the increase in the diameter of a portion of the roller 1 as a result of the bead 8, the regions of the drive belt which are supported by the bead are also subjected to greater tension, which causes the natural frequencies of the tensile strands 5–7 imbedded in the belt to vary with time and with lateral position in the belt. The natural frequencies of the various strands 5–7 in the belt are therefore no longer equal and constant but instead overlap each other and, in some cases, cancel each other. Consequently, the tendency of the belt to generate sympathetic vibration during operation is substantially reduced.

The bead 8 on the surface 2 of the guide roller 1 may, depending upon the specific application, have quite different geometries and arrangements. Examples of such different arrangements are illustrated in FIGS. 2–4, which are side views of the peripheral surface of a guide roller shown in schematic fashion.

Figure 2:
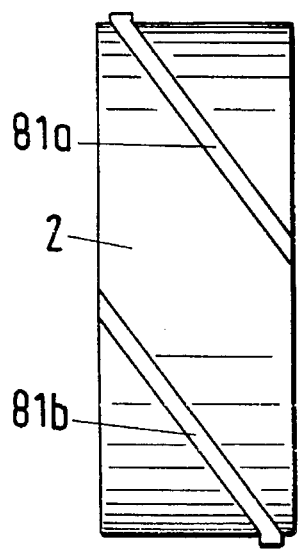
FIGS. 2–4 are side views showing alternative guide roller arrangements with beads which follow different paths on the surface of the roller.
Figure 3:
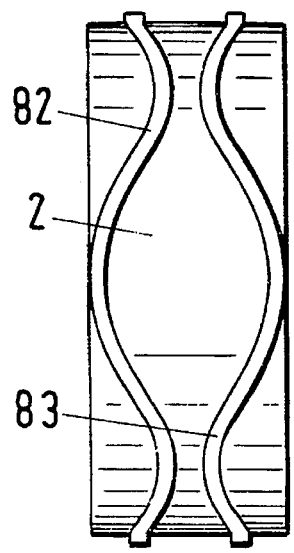

While a sine-curve arrangement of the bead along the surface of the roller is illustrated in FIG. 1, FIG. 2 shows two beads 81a and 81b, each extending halfway around the surface of the roller and forming sine-curve and cosine-curve sections respectively. According to FIG. 3, the roller surface has two beads 82 and 83 following approximately sine-curve and cosine-curve paths, respectively, completely around the surface 2 of the roller.

Figure 4:
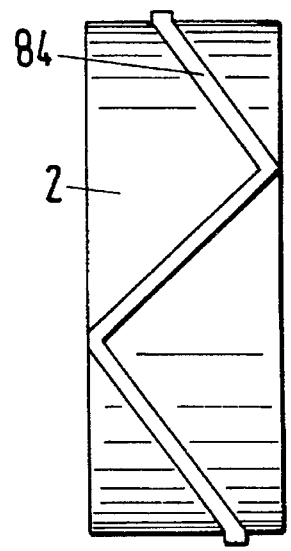

FIG. 4 shows an arrangement in which a bead 84 is formed of bead sections that extend perpendicularly to one another and have their starting and end points at the opposite sides of the peripheral surface 2.

In determining the cross-sectional configuration of the bead 8 and its disposition on the surface 2, two aspects should be taken into account. First, it must be certain that the necessary force can be applied to the drive belt 4 without causing the notch effect of the bead to cause premature belt wear. Second, the contact area between the belt and the roller surface should be as small as possible to minimize transfer of sympathetic vibrations from the belt to the engine structure. Schematic cross sectional representations of the roller 1, the belt 4 and a bead 8 which take these marginal conditions into account are illustrated in FIGS. 5–7.

Figure 5:
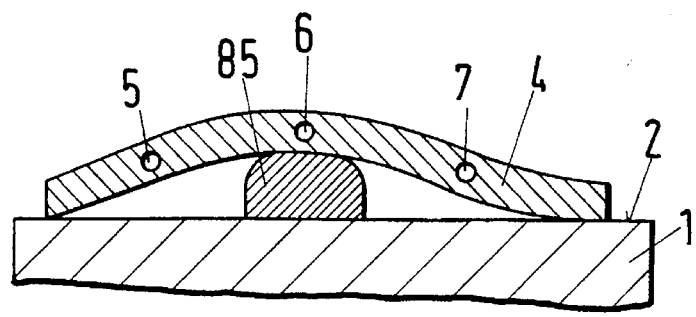
FIGS. 5–7 are schematic cross sectional views showing guide rollers having another form of bead with different shapes and a drive belt engaging the bead.

In FIG. 5, a bead 85 is formed with a substantially rectangular cross section, having rounded corners only in the region where it engages the drive belt 4. This cross sectional configuration makes the area of the engaging surface on the roller element 1 as small as possible to reduce transfer of sympathetic vibrations of the drive belt 4 to the roller.

Figure 6:
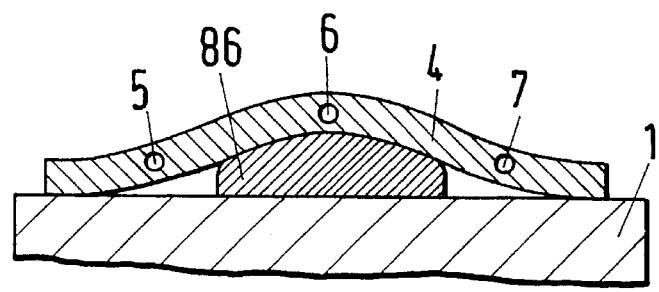

FIG. 6 shows a bead 86 having a substantially semicircular or elliptical cross section which permits a gentler application of force from the roller 1 into the drive belt 4. In this arrangement, of course, the increased area of the contact surface between the drive belt 4 and the roller 1 is disadvantageous.

Figure 7:
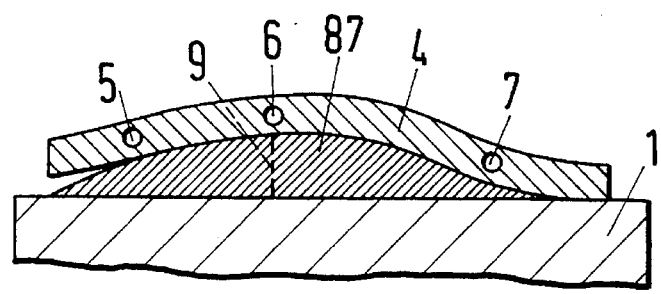

Finally, FIG. 7 shows an arrangement in which a bead 87 extends across almost the entire width of the surface 2 of the roller 1. In this case, however, the height 9 of the bead varies with the peripheral angle α and the lateral coordinate x on the roller surface 2 so that, during rotation of the roller 1 about its support shaft 3, different portions of the drive belt 4, and accordingly the tensile strands 5–7 within those portions, have different unsupported vibratable lengths between two adjacent guide rollers. This arrangements permits the best transfer of roller pressures into the drive belt, but with the shape represented by the bead 87, a relatively large contact surface is provided between the drive belt 4 and roller element 1 which is disadvantageous.

Although the invention has been described herein with reference to specific embodiments, many modifications and variations therein will readily occur to those skilled in the art. Accordingly, all such variations and modifications are included within the intended scope of the invention.

I claim:

1. A guide roller comprising a roller member supported for rotation about a longitudinal axis and having a peripheral surface extending between opposite side surfaces, and at least one bead formed on the peripheral surface and following approximately a sine curve in a direction transverse to the side surfaces.

2. A guide roller according to claim 1 wherein the bead has an upper surface with a high point which varies in location between the opposite side surfaces with the angular position of the roller.

3. A guide roller according to claim 1 including two beads each extending approximately half way around the roller and following approximately sine and cosine curves respectively on the surface.

4. A guide roller according to claim 1 including two beads extending around the roller and following approximately sine and cosine curves respectively on the surface.

5. A guide roller according to claim 1 wherein the bead is formed of a plurality of bead sections extending perpendicularly to one another and having starting and end points adjacent to the opposite side surfaces respectively.

6. A guide roller according to claim 1 wherein the bead has an approximately rectangular cross section.

7. A guide roller according to claim 1 wherein the bead has an approximately semicircular cross section.

8. A guide roller according to claim 1 wherein the bead has an approximately elliptical cross-section.

* * * * *